July 13, 1965
L. R. CONRATH
3,195,024
SHOCK MOUNTING AND COIL RETAINING
STRUCTURE FOR SOLENOIDS
Filed Aug. 2, 1963
2 Sheets-Sheet 1
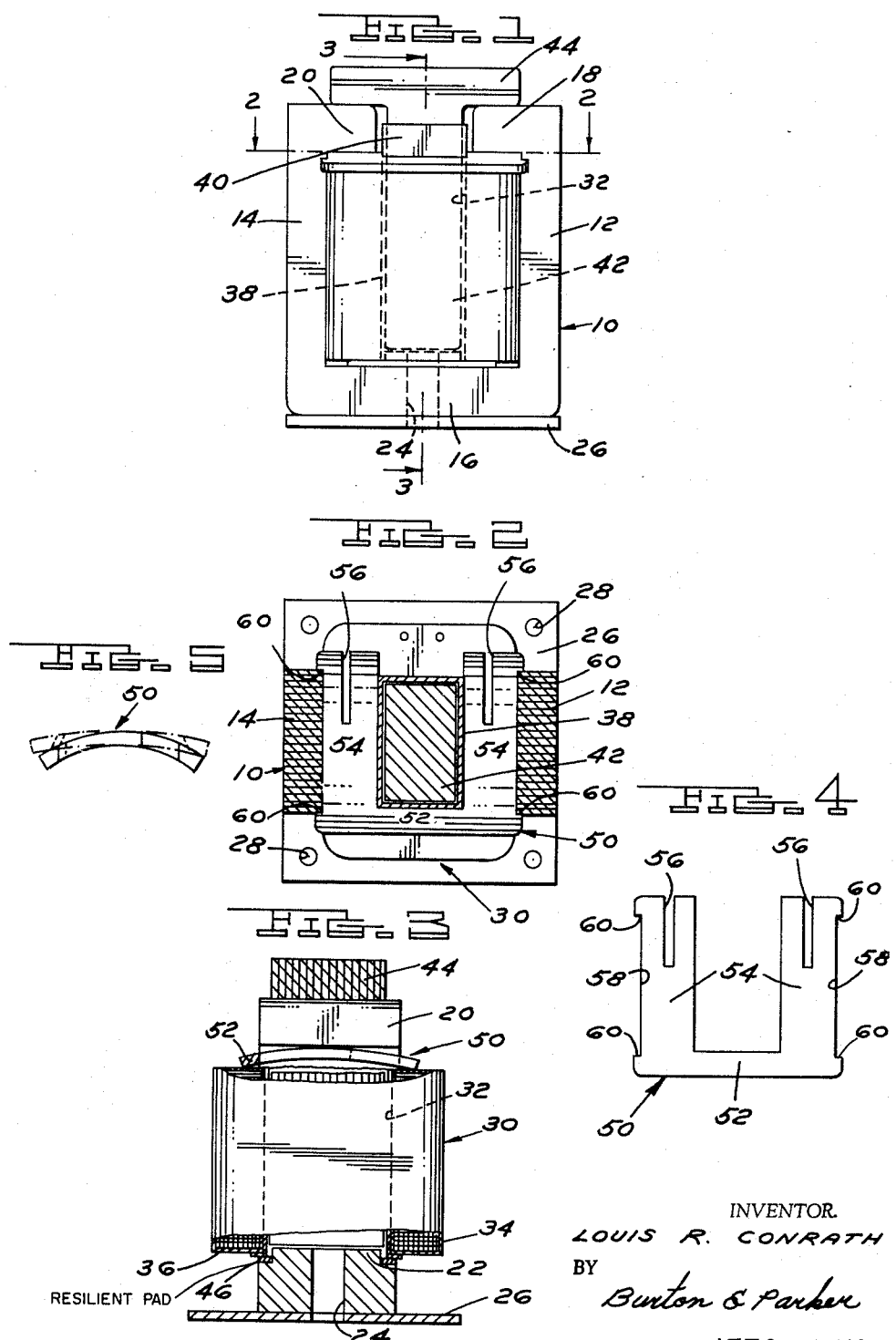
INVENTOR.
LOUIS R. CONRATH
BY
Burton & Parker
ATTORNEYS

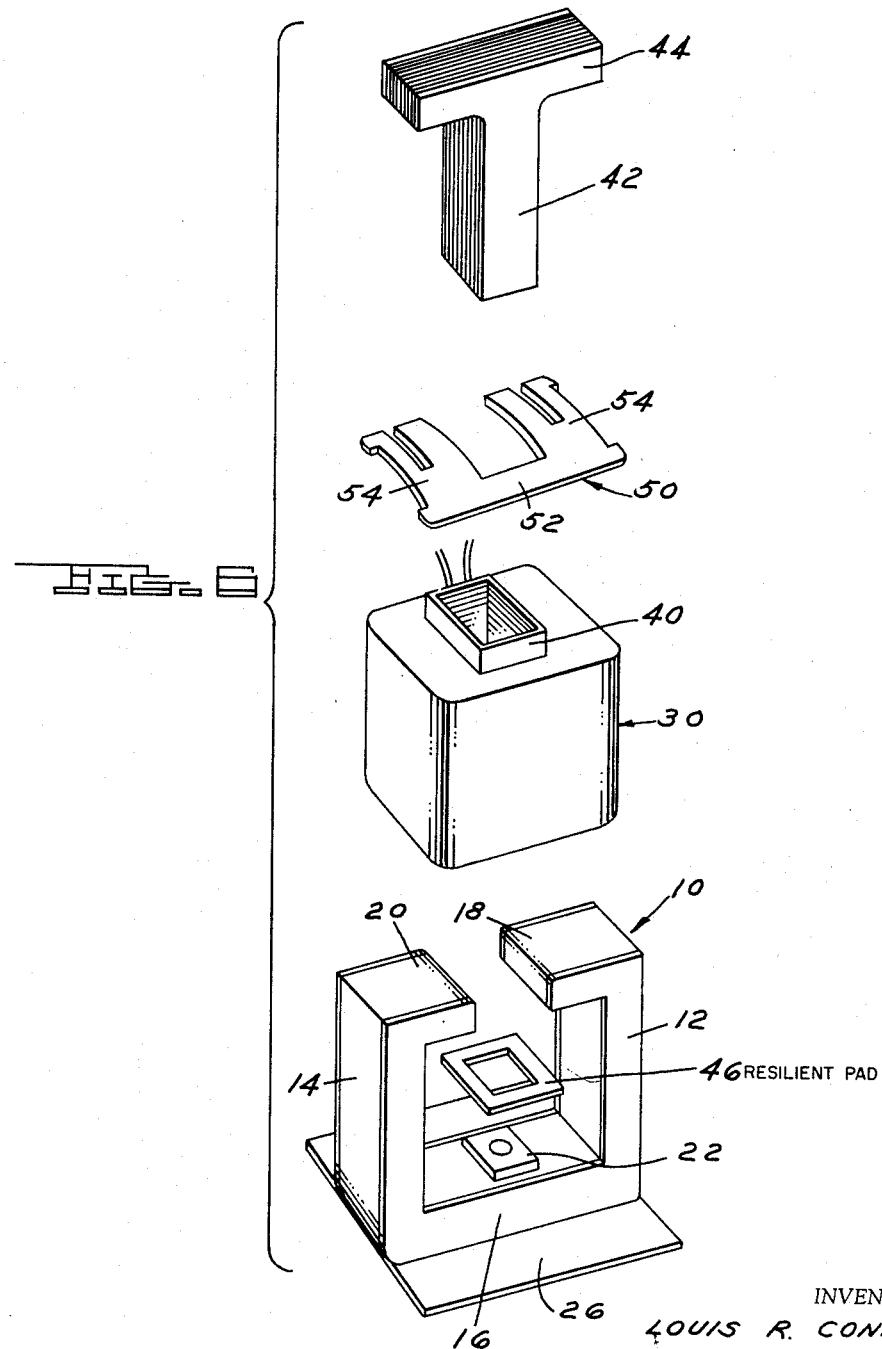

United States Patent Office 3,195,024
Patented July 13, 1965

3,195,024
SHOCK MOUNTING AND COIL RETAINING
STRUCTURE FOR SOLENOIDS
Louis R. Conrath, Huntington Woods, Mich., assignor to
Detroit Coil Company, Ferndale, Mich., a corporation
of Michigan
Filed Aug. 2, 1963, Ser. No. 299,657
4 Claims. (Cl. 317—191)

This invention relates to an improved solenoid, and more particularly it relates to improvements in the construction of a solenoid wherein the component parts of the solenoid structure are floatingly mounted and wherein means are provided for quickly and conveniently assembling the component parts of the structure together.

An object is the provision of a solenoid including a stator portion, a coil assembly portion, an armature portion, and a holding clip adapted to be interposed between the stator and coil assembly to quickly and simply releasably secure the component parts of the solenoid structure together.

Another object is the provision of a solenoid of the character above described wherein there is also provided a resilient pad interposed between the stator and the coil assembly, with the holding clip bearing against one end of the coil assembly and the resilient pad engaging the opposite end of the coil assembly to provide a shock absorber for the solenoid structure. As the holding clip and pad are each interposed between respective ends of the coil assembly and adjacent portions of the stator, they serve to floatingly mount the coil assembly within the solenoid structure.

A further object is the provision of a solenoid of the above-described character wherein the coil assembly is positioned between the arms of a C-shaped stator or stack and is seated on the bight portion of the C shape, and when so seated the coil is spaced from the overhanging ends of the stator arms with the holding clip in the form of a U-shaped member adapted to be interposed between the overhanging stator arms and the coil assembly resiliently tensioning the coil against the bight portion of the stack, and wherein the holding clip is provided with notches within which the stator arms are receivable to prevent relative movement between the various parts of the solenoid structure once assembled.

Other objects, advantages, and meritorious features will more fully appear from the following specification, claims, and accompanying drawings, wherein:

FIG. 1 is a side elevation of the solenoid assembly;
FIG. 2 is a transverse sectional view taken along the line 2—2 of FIG. 1;
FIG. 3 is a longitudinal sectional view taken along line 3—3 of FIG. 1;
FIG. 4 is a plan view of the holding clip which is used to hold the coil assembly in position within the stator;
FIG. 5 is an end elevation of the holding clip showing the clip in its relaxed and assembled positions; and
FIG. 6 is an exploded perspective view showing the component parts of the solenoid structure.

Referring to the drawings, the solenoid or electromagnetic device comprises a stator or stack in the form of a core structure generally indicated at 10 and having a substantially C-shaped configuration. This stack is formed of a multiplicity of laminations as is conventional practice. The C-shaped stack 10 exhibits two opposed arm portions 12 and 14 interconnected at one end by the bight portion 16. The opposite or upper ends of the arms are formed to project toward each other in overhanging upper end portions 18 and 20 terminating in spaced relation to provide therebetween an armature passageway.

The inwardly facing surface of the stator bight portion 16 is provided with an upstanding lug 22 over which the coil assembly is seated as described more fully hereinafter. A passageway 24 extends through the bight portion of the stator and through this lug to accommodate an operating element such as a rod or the like which may project therethrough to be actuated by the armature of the solenoid. Secured to the outwardly facing surface of the bight 16 is a solenoid mounting plate 26 having bolt holes 28 adjacent the corners thereof through which bolts may be extended for securing the solenoid to a support as desired. Plate 26 may be secured to the stator 10 in any convenient fashion, as by welding or the like, and the passageway 24 extends also through the plate 26, as shown in FIG. 3.

Removably receivable within the space between the arms 12 and 14 of the stator is an energizing coil assembly 30 which is slidable as a unit from either side of the stator to a position between the two arms. The coil assembly as shown includes a coil of fine wire wound about a central post or the like to provide a central passageway 32 through the coil, which is shown at 34 in FIG. 3, and a molded insulating jacket 36 within which the coil of wire is encased. A coil liner 38 of thin sheet metal or other suitable material extends through the passageway 32 in the coil and projects thereabove as indicated at 40 into the space between the overhanging end portions 18 and 20 of the stator arms 12 and 14. A generally T-shaped armature having a shank portion 42 and a head portion 44 is provided. The shank portion 42 is received between the overhanging end portions 18 and 20 of the stator arms and extends into the interior of the passageway through the coil for reciprocation therein. This armature may be built up of a multiplicity of thin laminations of magnetic material in a manner well known in the art. The head portion 44 of the armature is shown in FIGS. 1 and 3 as seating upon the upper ends 18 and 20 of the stator arms 12 and 14.

Interposed between the lower end of the coil assembly 30 and the bight portion 16 of the stator, is a resilient pad 46 made out of rubber or other suitable material. The pad 46 is preferably constructed as shown in FIG. 6 having a square aperture therethrough within which the lug 22 is receivable, so that the coil assembly 30 is supported on the pad 46 about the entire periphery of the coil passageway 32. Also, the pad is prevented from shifting on the stator by the lug projecting through the central aperture of the pad.

To secure the component parts of the solenoid together, there is provided a holding clip indicated generally at 50. This clip is generally U-shaped in configuration and comprises a base or bight portion 52 connected at opposite ends thereof to opposed complementary arms 54 projecting generally perpendicularly to the base 52. The free ends of the arms opposite the base 52 are provided with longitudinal slots 56 opening through the ends thereof, and the outer longitudinal marginal edge of each arm is provided with a shallow notch 58 terminating adjacent each end of the arm in a shoulder 60.

As shown most clearly in FIG. 5, the clip 50 is curved or bowed in end elevation, and is of such resiliency as to be yieldably deformable from the normal position indicated in solid outline in FIG. 5 to the position indicated in dotted outline in FIG. 5. The clip 50 is preferably made of a suitable plastic material such as nylon, Delrin or the like. The clip must be able to withstand the heat generated by the operation of the solenoid without melting, and must be sufficiently flexible so that it will not break under the impact shock of the plunger or armature striking the stator. In addition, the clip must be made of a material that will not fatigue under repeated flexing, and which will have a minimum of permanent set when deformed slightly within the solenoid assembly to hold the component parts of the structure together.

To assemble the coil assembly 30 within the stator 10, the resilient pad 46 is placed down encircling the lug 22 in engagement with the inner surface of the stator bight portion 16. The coil assembly 30 is then inserted from one side between the stator arms 12 and 14 and seated over the lug 22 of the bight portion of the stator. As shown in FIG. 3, the lug 22 projects upwardly into the open end of the coil passageway 32. As can be seen from an examination of FIG. 1, the upper end 40 of the coil liner 38 is received between the opposite ends of the overhanging stator arms 18 and 20. Referring back to FIG. 3, it will also be noted that the upper end of the coil assembly 30 is spaced below the underside of the overhanging end portions 18 and 20 of the stator arms 12 and 14. The U-shaped spring clip is next urged between the overhanging stator arms 18 and 20 and the upper end of the coil assembly 30, with the projecting portion 40 of the coil liner being slidably received within the open end of the clip between the opposed legs 54. The clip is urged between the stator and the coil until the inner edge of the clip bight portion 52 engages the end wall of coil liner projection 40 with the inner marginal edges of the clip arms 54 engaging the side wall portions of the coil liner projection 40 as shown in FIG. 2. As the clip passes between the upstanding stator arms 12 and 14, the outer end portions of the clip arms 54 will be compressed slightly in order to permit the clip to pass between the stator arms. This action is made possible by the provision of the longitudinal slots 56 opening through the ends of the clip arms 54 as shown in FIGS. 2 and 4. When the clip has been fully engaged, the outer end portions of the clip arms 54 spring outwardly, and the stator arms 12 and 14 are engaged within the notches 58 with the shoulder portion 60 hooked over the corners of the stator arms, holding the clip 50 positioned within the assembly. The clip is so proportioned that when the inner edge of the base portions 52 contacts the projecting coil liner portion 40, the shoulders 60 adjacent opposite ends of the clip base portion 52 engage the marginal edge of the stator arms 12 and 14. Thus the clip 50 is in effect locked over the stator arms 12 and 14 preventing relative movement of the clip with respect to the stator, as most clearly shown in FIG. 2.

It is to be noted that the normal height of the clip 50 is greater than the space between the coil assembly 30 and the overhanging stator arm portions 18 and 20 when the coil is assembled in the stator. As is shown in FIG. 5, the clip 50 is deformably squeezed between the coil and the overhanging stator arms, and assumes a shape substantially as shown in the dotted outline of FIG. 5. The position of the clip 50 with respect to the coil assembly 30 and the overhanging stator arm 20 is also shown in FIG. 3. The clip therefore acts in a manner much like a spring, with the base 52 and the outer free ends of the legs 54 bearing against the top of the coil assembly 30, and with an intermediate portion of the legs 54 bearing against the underside of the overhanging arms 18 and 20.

With the resilient pad 46 engaging the underside of the coil assembly 30 and the clip 50 engaging the upper side thereof, the coil assembly is in effect floatingly mounted within the stator 10. When thus assembled, the resilient pad and the clip serve to absorb the shock of the T-shaped armature striking against the overhanging arm portions 18 and 20 of the stator, and thus serve to prevent damage to the coil assembly as a result of the shock of impact when the armature or plunger strikes the stator. Thus, in addition to serving as a holding clip for securing the components of the solenoid structure together, the clip 50 also serves in cooperation with the resilient pad 46 to cushion or float the coil assembly within the solenoid structure.

With the solenoid assembled as above described, the structure may be conveniently secured to a support by means of the base plate 26. It should be noted that the base plate 26 may be secured to one of the stator arms 12 and 14 instead of to the stator bight portion 16, in the event it is desired to mount the solenoid in a different position. It may also be noted that the coil assembly 30 need not necessarily be of the molded construction indicated in the drawings, but may be constructed in any manner conventional in the industry. For example, the coil may be wound about a bobbin having a central passageway therethrough and projecting end plates overhanging opposite ends of the coil, as is well known in the art.

While the above description has emphasized the simplicity of assembling the solenoid component parts, it will be apparent that it is also possible to disassemble the structure rapidly by urging the outer end portions of the clip arms 54 toward each other and passing the clip out from between the coil assembly and the overhanging stator arms, and this assembly and disassembly may be effected without the use of any special tools.

What is claimed is:

1. In a solenoid, a generally C-shaped stator having opposed arms spaced apart providing a coil assembly-receiving space therebetween, said arms connected at one end by the bight portion of the C-shaped stator and provided at the end opposite to said bight portion with inturned arm portions terminating spaced apart providing an armature-receiving opening therebetween, said bight portion of the stator provided with a lug spaced between the stator arms and projecting upwardly, a coil assembly positioned between the stator arms seated upon the bight portion of the stator and spaced below the inturned ends of the stator arms and having a passageway therethrough received at one end over said lug and at the opposite end aligned with the armature-receiving opening between said inturned ends of the arms and a coil liner lining the walls of said passageway and having a portion extending beyond the coil toward the space between the inturned ends of the stator arms, a T-shaped armature having its shank portion reciprocably extending through the armature-receiving opening between said inturned ends of the stator arms and into said coil passageway, a resilient pad interposed between the bight portion of the stator and the coil assembly, and a generally U-shaped resilient clip removably deformably positioned in the space between the inturned arm portions of the stator and the coil assembly with the clip embracing that portion of the coil liner projecting toward the space between the inturned stator arms, said clip having longitudinally bowed arm portions and a base portion with the base portion and the extremities of said arm portions bearing against the upper end of the coil assembly on opposite sides of the stator arms respectively and with an intermediate portion of each arm bowed upwardly bearing against the underside of a respective overhanging stator arm portion tensioning the coil assembly yieldingly toward said resilient pad whereby said coil assembly is floatingly held between said pad and said clip within the stator.

2. The invention as defined in claim 1 characterized in that said resilient pad is provided with an aperature substantially centrally thereof through which said lug on the bight portion of the stator projects, preventing substantial lateral movement of the pad with respect to the stator.

3. The invention as defined in claim 1 characterized in that each of said clip arms is provided with a longitudinally extending notch in the outer marginal edge thereof within which a respective arm of the stator is positioned with each notch terminating at its opposite ends in a transverse shoulder portion embracing the stator arm to limit relative movement between the clip and the stator.

4. The invention as defined in claim 3 characterized in that said clip arms are each provided with a longitudinal slot opening through the free end of the arm permitting flexure of the notched outer marginal edge of the clip arm away from the stator arm during assembly of the clip within the stator, said edge of the clip arm being resiliently tensioned outwardly against said stator arm to seat the stator arm within said notch when the clip is assembled within the solenoid structure.

References Cited by the Examiner
UNITED STATES PATENTS

| | | | |
|---|---|---|---|
| 2,516,603 | 7/50 | Soreng et al. | 317—184 |
| 2,904,729 | 9/59 | Harwood | 317—191 |
| 3,017,547 | 1/62 | Jencks | 317—191 |
| 3,119,954 | 1/64 | Bachi | 317—186 |

LARAMIE E. ASKIN, *Primary Examiner.*